ated Nov. 2, 1965

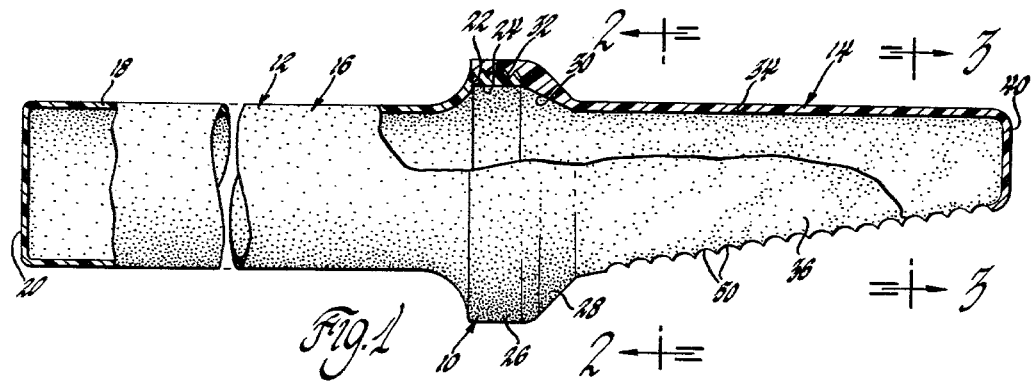

United States Patent Office 3,214,781
Patented Nov. 2, 1965

3,214,781
DEVICE FOR DISPENSING AND SPREADING
BUTTER AND THE LIKE
Seward W. Johnson, 58860 Romeo Plank Road, Washington, Mich., and Walter J. Riley, 111 Tecumseh, Clawson, Mich.
Filed Oct. 5, 1962, Ser. No. 228,585
22 Claims. (Cl. 15—514)

This invention relates to devices for dispensing fluent food products such as butter and the like and, in particular, to such a device which functions not only to dispense a food product but also to spread it relatively evenly in an efficient and effective manner onto a receiving surface such as a slice of bread, ear of sweet corn or the like.

Food product dispensers of the general type to which the present invention pertains have heretofore been proposed for dispensing various fluent food products and, in particular, mustard and catsup. More particularly, the most common type of dispenser for condiments of the type aforementioned typically comprises a hollow tubular elastic reservoir or bottle formed of a suitable material, such as any one of a well known variety of plastic materials, having an open threaded end adapted to be removably threadably connected to a suitable cap formed integral with a coaxial small diameter tubular spout having a circular opening in the remote end thereof. Thus, the bottle or reservoir is filled with catsup or mustard through the open end thereof and the cap of the spout threadably secured thereto, at which time the reservoir or bottle may be manually grasped and squeezed to force the condiment therefrom, through the spout and out the open end thereof to dispense the condiment on the desired receiving surface.

As will be readily apparent to those who have used such a device, which is quite common and has enjoyed considerable commercial success, the condiment dispensed therefrom is deposited relatively non-uniformly upon the receiving surface, thereby necessitating the subsequent use of a conventional kitchen or table knife or the like to spread the condiment on the receiving surface in the thickness desired. In many instances, either too much or an insufficient amount of the condiment is initially dispensed onto the receiving surface, thereby requiring removal of the excess condiment or still further and subsequent use of the device to dispense additional condiment which, in turn, must be spread.

It is, therefore, a principal object and feature of this invention to provide a combination dispenser and spreader knife member adapted to be removably connected to a suitable bottle or reservoir containing a fluent food product such as butter and the like, and comprising a hollow body member including a pair of spaced side walls having terminal lip portions defining therebetween an elongate continuous dispenser opening, whereby a food product supplied from the reservoir into the interior of the body member will be simultaneously dispensed from the dispenser opening and spread onto the receiving surface such as a slice of bread, an ear of corn or the like.

It is yet another object and feature of this invention to provide a device for dispensing and spreading a fluent food product such as butter, oleo margarine, mayonnaise, mustard, catsup, salad dressing, various jams, jellies and the like comprising, in combination, a hollow tubular manually graspable and squeezeable elastic reservoir or bottle open at one end thereof, a hollow relatively rigid axially elongated knife member open at one end thereof and closed at the other, such knife member including spaced side walls extending axially between the ends thereof and respectively having terminal lip portions defining therebetween an elongate continuous dispenser opening, and means for removably connecting the knife member and the reservoir or bottle with the respective open ends thereof in communication, whereby manual pressure applied to the reservoir or bottle forces a food product therefrom into the knife member and out of the dispenser opening along substantially the entire length of the latter. As a result, the food product may be simultaneously dispensed and spread on the receiving surface.

It is yet another object and feature of this invention, to provide a dispensing and spreading device of the type aforementioned characterized by the fact that the axes of the aforementioned reservoir or bottle and of the relatively rigid knife member removably connected thereto extend obliquely relative to each other, whereby the elongate dispenser opening may be placed in operative relationship with the receiving surface on which the food product is to be dispensed and spread while adequate clearance remains between the manually graspable reservoir or bottle relative to a table top or the like on which the receiving surface rests.

It is yet another object and feature of this invention to provide a device of the type aforementioned further characterized by the fact that the respective lip portions of the side walls of the knife member each include a substantially continuous series of adjacent undulations or scallops which help to strengthen and rigidify the knife member to either side of the dispenser opening while facilitating even dispensing flow of the food product therethrough.

It is yet another object and feature of this invention, according to one preferred embodiment, to provide a device of the type aforementioned further characterized by the fact that the aforementioned elongate dispenser opening extends in substantially a straight line particularly adapted for dispensing and spreading food products therethrough onto a slice of bread, lunch meat or similar substantially flat receiving surface.

It is yet another object and feature of this invention, according to another preferred embodiment thereof, to provide a device of the type aforementioned further characterized by the fact that the aforementioned elongate dispenser opening is of arcuate configuration facilitating placement thereof about a circumferential portion of an ear of corn or the like for dispensing and spreading butter axially therealong.

It is yet another object and feature of this invention, according to yet another embodiment thereof, to provide a device of the type aforementioned further characterized by the fact that the aforementioned terminal lip portions of the respective side walls of the knife member which form the elongate dispenser opening are of differing lengths, whereby the one lip portion extending beyond the other provides an additional spreading lip trailing behind the flow of the food product onto the receiving surface to facilitate even spreading thereof.

It is yet another object and feature of this invention, according to another embodiment thereof, to provide a device of the type aforementioned further characterized by a bottle or reservoir which is substantially of rectangular or square cross section and of a length particularly adapted to receive an initial charge of butter in closely confined relation therewithin, such as a common quarter-pound stick of butter at room temperature, whereby initially and thereafter there is relatively far less void area within the reservoir as the butter is dispensed or forced therefrom as compared to a cylindrical bottle or reservoir receiving such a stick of butter, thereby rendering the operation of the device much more positive than with a conventional cylindrical reservoir or bottle.

It is yet another object and feature of this invention, according to the last embodiment referred to immediately above, to provide a bottle or reservoir which is substantially rectangular or even square in cross section further characterized by a closed end wall opposite the open end thereof from which butter or the like is forced, such closed end wall being thinner and more flexible than the side wall of the bottle or reservoir thereby facilitating radial inward squeezing movement of the bottle to force the butter therefrom.

These and other objects, features and advantages of this invention will appear more fully hereinafter as the description thereof proceeds, and in which reference is made to the drawings in which:

FIGURE 1 is a fragmentary side elevational view, partly broken away and in section to illustrate certain details thereof, of a combination dispenser and spreader device illustrating one preferred embodiment of the invention;

FIGURE 2 is a sectional view taken on line 2—2 of FIGURE 1;

FIGURE 3 is a sectional view taken on line 3—3 of FIGURE 1;

FIGURE 4 is a sectional view corresponding generally to FIGURE 2, but illustrating another preferred embodiment of the invention;

FIGURE 5 is a fragmentary side elevational view, partly broken away and in section to illustrate certain details, of a combination dispenser and spreader device illustrating yet another preferred embodiment of the invention;

FIGURE 6 is a view taken on line 6—6 of FIGURE 5; and

FIGURE 7 is a sectional view taken on line 7—7 of FIGURE 5.

Referring now to the drawings, and particularly the embodiment illustrated in FIGURES 1 through 3 thereof, the numeral 10 generally indicates a device for dispensing and simultaneously spreading a fluent food product at room temperature such as butter, oleo margarine, mayonnaise, salad dressing, mustard, catsup, jam, jelly and the like comprising, in general, a hollow tubular manually graspable and squeezeable elastic axially extending reservoir or bottle 12 for the food product desired, and the hollow relatively rigid axially elongate knife member indicated generally at 14.

More specifically, the bottle or reservoir 12, although it may be formed of many different materials, is primarily adapted to be molded from a suitable plastic material so as to comprise an axially extending hollow tubular elastic main body member 16 including a continuous cylindrical side wall 18 of thin section extending between and formed integral with a flat closed end wall 20 at one end thereof and an enlarged circular head member 22 defining an axially opposite open end 24, the head member being threaded on its exterior surface as is clearly illustrated in FIGURE 1. Thus, the body member is adapted to be manually grasped and squeezed so as to be elastically deformed radially inwardly of its axis to force a given food product from the interior thereof out through the open end 24.

The knife member 14 is likewise particularly adapted to be molded from a suitable plastic, although other materials may be employed, and is of relatively rigid integral construction particularly when compared to the elastic integral bottle or reservoir 12. More specifically, the integral knife member 14 comprises an enlarged circular cap member 26 and tapered conical neck portion 28 defining an open end 30 thereof, the cap member being provided with internal threads cooperating with the threads previously described as indicated at 32 to removably threadably connect the reservoir or bottle and knife member with their respective open ends 24 and 30 in communication with each other. The knife member further includes an axially extending relatively rigid hollow main body member 34 including the closely spaced laterally inwardly and axially tapering side wall members 36 and 38 extending between the neck portion 28 and an axially opposite closed nose portion 40 of the knife member. The side walls 36 and 38 define an upper elongate cavity 42 and terminate, respectively, in elongate lip portions 44 and 46 defining therebetween an elongate continuous dispenser opening 48 communicating throughout its length between the side wall members with the relatively larger cavity 42. As will be noted particularly from FIGURE 1, the elongate dispenser opening 48 extends in substantially a straight line between the cap member 26 and neck portion 28 and the nose portion 40 of the knife member and, together with the axis of the body member 34, obliquely to the axis of the bottle or reservoir 12 and the cap member 26 of the knife member. In addition, it may be seen that each of the lip portions 44 and 46 of the respective side walls 36 and 38 are provided with a substantially continuous series of undulations or scallops 50 which help to rigidify the respective lip portions and provide an even dispensing flow of the food product in question from the dispenser opening 48.

In operation, it will be appreciated that the bottle or reservoir 12 may be loaded with a suitable food product at room temperature merely by unscrewing the cap member 26 of the knife member 14 from the bottle or reservoir, and such a food product loaded therein through the open end 24 thereof, at which time the knife member is threadably reassembled onto the open end of the bottle or reservoir in the operative relationship illustrated in FIGURE 1. When it is desired to spread the food product on a substantially flat receiving surface such as a slice of bread, a piece of lunch meat or the like, the body member 16 of the bottle or reservoir is grasped manually in the hand of the user and the straight elongate dispenser opening 48 laid across the receiving surface. In this regard, while both lip portions 44 and 46 may be engaged with the receiving surface, it may be desirable under certain circumstances to rotate the knife member slightly about its axis to lift one or the other of the lip portions 44 and 46 slightly from the receiving surface and relative to the other which may be in engagement therewith. In either event, and due to the oblique relationship of the body member 34 and the elongate dispenser opening 48 relative to the axis of the bottle or reservoir 12, it will be immediately clear that, in effect, the bottle or reservoir will project upwardly and away to a predetermined extent from the slice of bread or the like and from the table or other support on which it rests, thereby providing sufficient clearance for the hand of the user grasping the bottle with respect to such table or support.

At this time, the body member 16 of the bottle or reservoir may be squeezed in the hand while, simultaneously, drawing the knife member 14 across the receiving surface. As a result, the food product is forced from the bottle or reservoir through its opening 24 into the cavity 42 of the knife member, resulting in the food product within the knife member being forced down between the side walls 36 and 38 and through substantially the entire length of the elongate opening 48 onto the receiving surface. Naturally, since the food product is flowing from the knife member substantially along the entire length of dispenser opening 48 while the knife member itself is being drawn across the receiving surface, the food product is not only dispensed but is also spread across the receiving surface. After using the device, the latter may be stood on its end wall 20, if desired. When the bottle or reservoir is emptied, or it is desired to load it with a different food product, it will be obvious that the knife member may be easily detached therefrom and a new food product loaded in the bottle or reservoir as previously described.

FIGURE 4 illustrates another embodiment of the invention involving primarily a modification of the knife member 14 previously described, and otherwise adapted for use with a bottle or reservoir such as that previously described. Accordingly, like numerals are employed with respect to FIGURE 4 to indicate parts thereof which may correspond exactly to those previously described, and like numerals primed are employed to indicate parts differing from, but corresponding generally, to those previously described.

Thus, referring to FIGURE 4, it may be seen that the knife member 14' is intended to be associated with a bottle or reservoir as previously described, and comprises a threaded cap member 26, conical neck portion 28 and an elongate body member 34 including the upper cavity 42 and closely spaced depending side walls 36 and 38 each terminating in the respective lip portion 44' and 46' defining elongate dispenser opening 48. However, in this embodiment, the side wall 36 and hence its lip portion 44' extends beyond the lip portion 46' to a predetermined extent throughout the respective lengths of the side walls thereby resulting, in effect, in an elongate continuous spreader lip portion 52. In this embodiment, as in the one previously described, the elongate dispenser opening 48 extends in a substantially straight line and, together with the axis of the body member 34, obliquely relative to the axis of the cap member 26 and the bottle or reservoir. Unlike the previous embodiment, no undulations or scalloping is employed on the terminal lip portion 44' and 46'.

The operation of the knife member as illustrated in FIGURE 4 is substantially identical to that previously described. However, this particular knife member differs from that previously described in being adapted to be rotated slightly about its longitudinal axis to dispose substantially the entire lengths of the respective lip portions 44' and 46' in engagement with the receiving surface such as a slice of bread. Thus, as the food product is forced out of the dispenser opening 48 and as the knife member is moved from left to right in FIGURE 4, the trailing lip portion 52 smooths the dispensed food product very evenly over the receiving surface.

Reference will now be made to FIGURES 5, 6 and 7 illustrating another preferred embodiment of the invention particularly adapted for simultaneously evenly spreading and dispensing butter on an ear of sweet corn which is illustrated in dotted lines in the drawings. Thus, the numeral 54 generally indicates such a device comprising an integral hollow tubular elastic bottle or reservoir 56 and a relatively rigid integral hollow knife member 58. More specifically, the bottle or reservoir again is adapted primarily for molding from a suitable plastic material so as to result in an axially extending hollow tubular elastic main body member 60 including a continuous side wall 62 of rectangular cross section formed integral with an enlarged circular head member 64 at one end thereof defining an opening 66 to the interior of the bottle, and an integral end wall 68 at the other end thereof axially inwardly recessed within the interior of the reservoir and comprising the rectangular central section 70 joined to the continuous side wall 62 by the rearwardly and upwardly inclined trapezoidal wall sections 72. The head member 64 is externally threaded as before.

As will be readily apparent from FIGURE 5 of the drawing, the continuous side wall 62 is of greater thickness than the thickness of the end wall 68 comprising the wall sections 70 and 72. Furthermore, the rectangular, and specifically square as illustrated, cross sectional configuration of the main body member of the bottle or reservoir and its length are particularly adapted to receive therewithin a conventional quarter-pound stick of butter at room temperature which, therefore, is closely confined within the side wall 62 of the main body member and extends between the central end wall section 70 and the open end 66 of the bottle or reservoir to minimize void space within the bottle during the dispensing action. Although the body member 60 is inherently elastic, the rectangular or square cross section thereof would have a tendency to resist elastic radial deformation thereof absent the end wall 68. Thus, due to the particular relationship of the relatively thin end wall 68 to the thicker side wall 62, the body member 60 may be manually grasped and readily squeezed radially inwardly toward the axis thereof due to the flexible nature of the end wall 68 and notwithstanding the rectangular, or square, cross section of the body member.

The integral relatively rigid hollow knife member 58, with one exception to be pointed out below, is substantially identical to that previously described in comprising a circular cap member 74 defining with the tapered conical neck portion 76 thereof an open end 78 adapted to be threadably connected as indicated at 80 to the head member 64 of the bottle or reservoir to place the respective open ends of the bottle or reservoir and knife member in communication, a close nose portion 82 axially opposite the open end thereof, and a main body member 84 extending therebetween and including the depending closely spaced laterally inwardly tapering side walls 84 which define an upper elongate cavity 86 and terminate in the respective lip portions 88 defining therebetween an elongate dispenser opening 90 communicating with the cavity 86. Also, each of the lip portions 88 include a continuous series of undulations or scallops 92 similar to those previously described. However, unlike the embodiments previously described, the elongate dispenser opening 90 is of arcuate configuration along the length of body member 84 and adapted to embrace a predetermined circumferential surface area of an ear of corn or the like indicated at 94 in dotted lines. It will also be noted that the general configuration of the lower closed edge 96 of the knife member to either side of the dispenser opening 90 as well as the axis of body member 84 extend obliquely to the axis of the cap member 74 and the bottle or reservoir 56.

In operation, the embodiment of FIGURES 5 through 7 may be loaded with butter as previously described and the knife member 58 engaged with an ear of corn as illustrated in FIGURES 5 and 7 with the ear held in one hand or resting on a platter as the case may be. In the latter event, the oblique relationship of the lower edge 96 of the knife member relative to axis of the bottle or reservoir 56 insures that there will be sufficient clearance for the hand of the user relative to the table or other support on which the platter of corn rests. The bottle or reservoir is manually grasped and squeezed to force the butter into and along the cavity 86 of the knife member, resulting in butter being forced through the arcuate elongate dispenser opening 90 substantially throughout its entire length onto the surface of the corn 94, it being understood that, simultaneously with such dispensing action, the knife member 58 is drawn along the surface of the butter to spread the butter thereon. Again, the undulations or scallops 92 are provided to strengthen the relatively rigid knife member and to enhance an even flow of butter therefrom.

At this juncture, and while readily apparent, perhaps it should be noted that, while the bottle or reservoir 56 has been particularly designed for containing a conventional quarter-pound stick of butter, it may be interchanged with the bottle or reservoir 12 of FIGURE 1 and used in dispensing such a stick of butter or other of the food products referred to above in combination with the knife member 14. In similar fashion, the bottle or reservoir 12 may be interchanged with the bottle or reservoir 56 for use with the knife member 58 in buttering an ear of corn as previously described, in which case it is preferable that the bottle or reservoir 12 be loaded or charged with bulk butter at room temperature to substantially fill the bottle or reservoir. In addition, the respective side walls of the knife members 14 and 58, although disclosed in conjunction with the embodiments of FIGURES 1 and 5 as including the undulations or scallops 50 and 92, may be devoid of such undulations or scallops as suggested by the embodiment of FIGURE 4, or the latter embodiment including the one side wall lip portion extending beyond the other may be incorporated, with or without the scallops or undulations, in the embodiments of FIGURE 1 or FIGURE 5. In other words, it should be readily apparent that the respective bottles or reservoirs 12 and 56, knife members 14, 14' and 58 and the various details thereof illustrated by the drawing may be readily interchanged in dispensing and spreading a variety of food products as referred to above, although the bottle or reservoir 56 of FIGURE 5, irrespective of the type of knife member with which it is associated, is preferred for dispensing a conventional quarter-pound stick of butter at room temperature. Consequently, notwithstanding the interchangeability of the various components of the devices herein disclosed, it has been deemed unnecessary to burden the drawings with many additional views showing these various combinations which may be made.

While several forms of the invention have been shown and described, other forms will now be apparent to those skilled in the art. Therefore, it will be understood that the embodiments shown in the drawing and described above are merely for illustrative purposes, and are not intended to limit the scope of the invention which is defined by the claims which follow.

We claim:

1. A device for dispensing and spreading a fluent food product such as butter and the like comprising a hollow axially extending food product reservoir open at one axial end thereof and closed at the other, a hollow axially elongate knife member open at one axial end thereof and closed at the other, said knife member including spaced side walls extending between said ends thereof and respectively having elongate terminal lip portions defining therebetween an elongate dispenser opening, said respective lip portions of said side walls of said knife member each include a series of undulations therealong to strengthen same and provide substantially even flow through said dispenser opening, and means for removably connecting said member and said reservoir with the respective open ends thereof in communication, a food product may be supplied from said reservoir into said member and out of said dispenser opening along substantially the entire length of the latter.

2. A device for dispensing and spreading a fluent food product such as butter and the like comprising a hollow axially extending food product reservoir open at one axial end thereof and closed at the other, a hollow axially elongate knife member open at one axial end thereof and closed at the other, said knife member including spaced side walls extending between said ends thereof and respectively having elongate terminal lip portions defining therebetween an elongate dispenser opening, one of said lip portions of said side walls of said knife member extends beyond the other lip portion to a predetermined extent, such extension forming a trailing elongate spreading lip portion, and means for removably connecting said member and said reservoir with the respective open ends thereof in communication, a food product may be supplied from said reservoir into said member and out of said dispenser opening along substantially the entire length of the latter.

3. A device for dispensing and spreading a fluent food product such as butter and the like comprising a hollow axially extending food product reservoir open at one axial end thereof and closed at the other, a hollow axially elongate knife member open at one axial end thereof and closed at the other, said knife member including spaced side walls extending between said ends thereof and respectively having elongate terminal lip portions defining therebetween an elongate dispenser opening, said dispenser opening being arcuately curved between said ends of said knife member, and means for removably connecting said member and said reservoir with the respective open ends thereof in communication, a food product may be supplied from said reservoir into said member and out of said dispenser opening along substantially the entire length of the latter.

4. A device for dispensing and spreading a fluent food product such as butter and the like comprising a hollow axially extending food product reservoir open at one axial end thereof and closed at the other, a hollow axially elongate knife member open at one axial end thereof and closed at the other, said knife member including spaced side walls extending between said ends thereof and respectively having elongate terminal lip portions defining therebetween an elongate dispenser opening, said respective lip portions of said side walls of said knife member each include a series of undulations therealong to strengthen same and provide substantially even flow through said dispenser opening, one of said lip portions of said side walls of said knife member extends beyond the other lip portion to a predetermined extent, such extension forming a trailing elongate spreading lip portion, and means for removably connecting said member and said reservoir with the respective open ends thereof in communication, a food product may be supplied from said reservoir into said member and out of said dispenser opening along substantially the entire length of the latter.

5. A device for dispensing and spreading a fluent food product such as butter and the like comprising a hollow axially extending food product reservoir open at one axial end thereof and closed at the other, a hollow axially elongate knife member open at one axial end thereof and closed at the other, said knife member including spaced side walls extending between said ends thereof and respectively having elongate terminal lip portions defining therebetween an elongate dispenser opening, said respective lip portions of said side walls of said knife member each include a series of undulations therealong to strengthen same and provide substantially even flow through said dispenser opening, one of said lip portions of said side walls of said knife member extends beyond the other lip portion to a predetermined extent, such extension forming a trailing elongate spreading lip portion, said dispenser opening being arcuately curved between said ends of said knife member, and means for removably connecting said member and said reservoir with the respective open ends thereof in communication, a food product may be supplied from said reservoir into said member and out of said dispenser opening along substantially the entire length of the latter.

6. A device for dispensing and spreading a fluent food product such as butter and the like comprising a hollow manually graspable and squeezeable elastic axially extending food product reservoir open at one axial end thereof and closed at the other, a hollow relatively rigid axially elongate knife member open at one axial end thereof and closed at the other, said knife member including spaced side walls extending between said ends thereof and respectively having elongate terminal lip portions defining therebetween an elongate continuous dispenser opening, said respective lip portions of said side walls of said knife member each including a series of undulations therealong to strengthen same and provide substantially even flow through said dispenser opening, and means for removably connecting said member and said reservoir with the respective open ends thereof in communication, whereby manual pressure applied to said reservoir forces a food product therefrom into said member and out of said dispenser opening along substantially the entire length of the latter.

7. A device for dispensing and spreading a fluent food product such as butter and the like comprising a hollow manually graspable and squeezeable elastic axially extending food product reservoir open at one axial end thereof and closed at the other, a hollow relatively rigid axially elongate knife member open at one axial end thereof and closed at the other, said knife member including spaced side walls extending between said ends thereof and respectively having elongate terminal lip portions defining therebetween an elongate continuous dispenser opening, one of said lip portions of said side walls of said knife member extending beyond the other lip portion to a predetermined extent, such extension forming a trailing elongate spreading lip portion, and means for removably connecting said member and said reservoir with the respective open ends thereof in communication, whereby manual pressure applied to said reservoir forces a food product therefrom into said member and out of said dispenser opening along substantially the entire length of the latter.

8. A device for dispensing and spreading a fluent food product such as butter and the like comprising a hollow manually graspable and squeezeable elastic axially extending food product reservoir open at one axial end thereof and closed at the other, a hollow relatively rigid axially elongate knife member open at one axial end thereof and closed at the other, said knife member including spaced side walls extending between said ends thereof and respectively having elongate terminal lip portions defining therebetween an elongate continuous dispenser opening, said dispenser opening being arcuately curved between said ends of said knife member, and means for removably connecting said member and said reservoir with the respective open ends thereof in communication, whereby manual pressure applied to said reservoir forces a food product therefrom into said member and out of said dispenser opening along substantially the entire length of the latter.

9. A device for dispensing and spreading a fluent food product such as butter and the like comprising a hollow manually graspable and squeezeable elastic axially extending food product reservoir open at one axial end thereof and closed at the other, said reservoir having a main body portion including a continuous integral side wall extending between and connecting said ends of said reservoir, said main body portion being rectangular in cross section, a hollow relatively rigid axially elongate knife member open at one axial end thereof and closed at the other, said knife member including spaced side walls extending between said ends thereof and respectively having elongate terminal lip portions defining therebetween an elongate continuous dispenser opening, and means for removably connecting said member and said reservoir with the respective open ends thereof in communication, whereby manual pressure applied to said reservoir forces a food product therefrom into said member and out of said dispenser opening along substantially the entire length of the latter.

10. A device for dispensing and spreading a fluent food product such as butter and the like comprising a hollow manually graspable and squeezeable elastic axially extending food product reservoir open at one axial end thereof and closed at the other, said closed end of said reservoir comprises an integral wall member joined to said side wall and axially inwardly depressed relative to the interior of said reservoir, said end wall being thinner in cross section and relatively more flexible than said side wall of said reservoir to facilitate squeezing of said side wall radially inwardly relative to the axis of said reservoir, a hollow relatively rigid axially elongate knife member open at one axial end thereof and closed at the other, said knife member including spaced side walls extending between said ends thereof and respectively having elongate terminal lip portions defining therebetween an elongate continuous dispenser opening, and means for removably connecting said member and said reservoir with the respective open ends thereof in communication, whereby manual pressure applied to said reservoir forces a food product therefrom into said member and out of said dispenser opening along substantially the entire length of the latter.

11. A device for dispensing and spreading a fluent food product such as butter and the like comprising a hollow manually graspable and squeezeable elastic axially extending food product reservoir open at one axial end thereof and closed at the other, a hollow relatively rigid axially elongate knife member open at one axial end thereof and closed at the other, said knife member including spaced side walls extending between said ends thereof and respectively having elongate terminal lip portions defining therebetween an elongate continuous dispenser opening, said respective lip portions of said side walls of said knife member each including a series of undulations therealong to strengthen same and provide substantially even flow through said dispenser opening, one of said lip portions of said side walls of said knife member extending beyond the other lip portion to a predetermined extent, such extension forming a trailing elongate spreading lip portion, and means for removably connecting said member and said reservoir with the respective open ends thereof in communication, whereby manual pressure applied to said reservoir forces a food product therefrom into said member and out of said dispenser opening along substantially the entire length of the latter.

12. A device for dispensing and spreading a fluent food product such as butter and the like comprising a hollow manually graspable and squeezeable elastic axially extending food product reservoir open at one axial end thereof and closed at the other, a hollow relatively rigid axially elongate knife member open at one axial end thereof and closed at the other, said knife member including spaced side walls extending between said ends thereof and respectively having elongate terminal lip portions defining therebetween an elongate continuous dispenser opening, said respective lip portions of said side walls of said knife member each including a series of undulations therealong to strengthen same and provide substantially even flow through said dispenser opening, one of said lip portions of said side walls of said knife member extending beyond the other lip portion to a predetermined extent, such extension forming a trailing elongate spreading lip portion, said dispenser opening being arcuately curved between said ends of said knife member, and means for removably connecting said member and said reservoir with the respective open ends thereof in communication, whereby manual pressure applied to said reservoir forces a food product therefrom into said member and out of said dispenser opening along substantially the entire length of the latter.

13. A device for dispensing and spreading a fluent food product such as butter and the like comprising a hollow manually graspable and squeezeable elastic axially extending food product reservoir open at one axial end thereof and closed at the other, said reservoir having a main body portion including a continuous integral side wall extending between and connecting said ends of said reservoir, said main body portion being rectangular in cross section, said closed end of said reservoir comprises an integral wall member joined to said side wall and axially inwardly depressed relative to the interior of said reservoir, said end wall being thinner in cross section and relatively more flexible than said side wall of said reservoir to facilitate squeezing of said side wall radially inwardly relative to the axis of said reservoir, a hollow relatively rigid axially elongate knife member open at one axial end thereof and closed at the other, said knife member including spaced side walls extending between said ends thereof and respectively having elongate terminal lip portions defining therebetween an elongate continuous dispenser opening, and means for removably connecting said member and said reservoir with the respective open ends thereof in communication, whereby manual pressure applied to said reservoir forces a food product therefrom into said member and out of said dispenser opening along substantially the entire length of the latter.

14. A device for dispensing and spreading a fluent food product such as butter and the like comprising a hollow manually graspable and squeezeable elastic axially extending food product reservoir open at one axial end thereof and closed at the other, said reservoir having a main body portion including a continuous integral side wall extending between and connecting said ends of said reservoir, said main body portion being rectangular in cross section, a hollow relatively rigid axially elongate knife member open at one axial end thereof and closed at the other, said knife member including spaced side walls extending between said ends thereof and respectively having elongate terminal lip portions defining therebetween an elongate continuous dispenser opening, said respective lip portions of said side walls of said knife member each including a series of undulations therealong to strengthen same and provide substantially even flow through said dispenser opening, and means for removably connecting said member and said reservoir with the respective open ends thereof in communication, whereby manual pressure applied to said reservoir forces a food product therefrom into said member and out of said dispenser opening along substantially the entire length of the latter.

15. A device for dispensing and spreading a fluent food product such as butter and the like comprising a hollow manually graspable and squeezable elastic axially extending food product reservoir open at one axial end thereof and closed at the other, said reservoir having a main body portion including a continuous integral side wall extending between and connecting said ends of said reservoir, said main body portion being rectangular in cross section, a hollow relatively rigid axially elongate knife member open at one axial end thereof and closed at the other, said knife member including spaced side walls extending between said ends thereof and respectively having elongate terminal lip portions defining therebetween an elongate continuous dispenser opening, one of said lip portions of said side walls of said knife member extending beyond the other lip portion to a predetermined extent, such extension forming a trailing elongate spreading lip portion, and means for removably connecting said member and said reservoir with the respective open ends thereof in communication, whereby manual pressure applied to said reservoir forces a food product therefrom into said member and out of said dispenser opening along substantially the entire length of the latter.

16. A device for dispensing and spreading a fluent food product such as butter and the like comprising a hollow manually graspable and squeezeable elastic axially extending food product reservoir open at one axial end thereof and closed at the other, said reservoir having a main body portion including a continuous integral side wall extending between and connecting said ends of said reservoir, said main body portion being rectangular in cross section, a hollow relatively rigid axially elongate knife member open at one axial end thereof and closed at the other, said knife member including spaced side walls extending between said ends thereof and respectively having elongate terminal lip portions defining therebetween an elongate continuous dispenser opening, said dispenser opening being arcuately curved between said ends of said knife member, and means for removably connecting said member and said reservoir with the respective open ends thereof in communication, whereby manual pressure applied to said reservoir forces a food product therefrom into said member and out of said dispenser opening along substantially the entire length of the latter.

17. A knife member adapted to be removably connected in communication with a reservoir for a fluent food product such as butter and the like, said knife member comprising a hollow relatively rigid axially elongate body member having a cap at one axial end thereof defining an opening for communication with the reservoir and enclosed at the other end thereof, said body member including a pair of spaced elongate side walls extending between said ends thereof and respectively having elongate terminal lip portions defining therebetween an elongate dispenser opening, said respective lip portions of said side walls of said body member each include a series of undulations therealong to strengthen same and provide substantially even flow through said dispenser opening, and means on said cap for removably connecting said knife member in communication with the reservoir, whereby a food product supplied from said reservoir to the interior of said knife member will be dispensed therefrom through said dispenser opening along substantially the entire length of the latter.

18. A knife member adapted to be removably connected in communication with a reservoir for a fluent food product such as butter and the like, said knife member comprising a hollow relatively rigid axially elongate body member having a cap at one axial end thereof defining an opening for communication with the reservoir and closed at the other end thereof, said body member including a pair of spaced elongate side walls extending between said ends thereof and respectively having elongate terminal lip portions defining therebetween an elongate dispenser opening, one of said lip portions of said side walls of said body member extending beyond the other lip portion to a predetermined extent, such extension forming a trailing elongate spreading lip portion, and means on said cap for removably connecting said knife member in communication with the reservoir, whereby a food product supplied from said reservoir to the interior of said knife member will be dispensed therefrom through said dispenser opening along substantially the entire length of the latter.

19. A knife member adapted to be removably connected in communication with a reservoir for a fluent food product such as butter and the like, said knife member comprising a hollow relatively rigid axially elongate body member having a cap at one axial end thereof defining an opening for communication with the reservoir and closed at the other end thereof, said body member including a pair of spaced elongate side walls extending between said ends thereof and respectively having elongate terminal lip portions defining therebetween an elongate dispenser opening, said dispenser opening being arcuately curved between said ends of said body member, and means on said cap for removably connecting said knife member in communication with the reservoir, whereby a food product supplied from said reservoir to the interior of said knife member will be dispensed therefrom through said dispenser opening along substantially the entire length of the latter.

20. A knife member adapted to be removably connected in communication with a reservoir for a fluent food product such as butter and the like, said knife member comprising a hollow relatively rigid axially elongate body member having a cap at one axial end thereof defining an opening for communication with the reservoir and closed at the other end thereof, said body member including a pair of spaced elongate side walls extending between said ends thereof and respectively having elongate terminal lip portions defining therebetween an elongate dispenser opening, said respective lip portions of said side walls of said body member each include a series of undulations therealong to strengthen same and provide substantially even flow through said dispenser opening, one of said lip portions of said side walls of said body member extending beyond the other lip portion to a predetermined extent, such extension forming a trailing elongate spreading lip portion, and means on said cap for removably connecting said knife member in communication with the reservoir, whereby a food product supplied from said reservoir to the interior of said knife member will be dispensed therefrom through said dispenser opening along substantially the entire length of the latter.

21. A knife member adapted to be removably connected in communication with a reservoir for a fluent food product such as butter and the like, said knife member comprising a hollow relatively rigid axially elongate body member having a cap at one axial end thereof defining an opening for communication with the reservoir and closed at the other end thereof, said body member including a pair of spaced elongate side walls extending between said ends thereof and respectively having elongate terminal lip portions defining therebetween an elongate dispenser opening, said respective lip portions of said side walls of said body member each include a series of undulations therealong to strengthen same and provide substantially even flow through said dispenser opening, one of said lip portions of said side walls of said body member extending beyond the other lip portion to a predetermined extent, such extension forming a trailing elongate spreading lip portion, said dispenser opening being arcuately curved between said ends of said body member, and means on said cap for removably connecting said knife member in communication with the reservoir, whereby a food product supplied from said reservoir to the interior of said knife member will be dispensed therefrom through said dispenser opening along substantially the entire length of the latter.

22. A reservoir for a fluent food product such as butter and the like adapted to be removably connected in communication with a dispensing member for such product, said reservoir comprising an elastic axially extending manually graspable and squeezeable hollow body member including a continuous integral side wall, said body member being open at one axial end thereof and closed at the other and rectangular in cross section, the closed end of said reservoir including an integral end wall joined to said side wall and axially inwardly depressed relative to the interior of said reservoir, said end wall being thinner in cross section and relatively more flexible than said side wall of said reservoir to facilitate squeezing of said side wall radially inwardly relative to the axis of said body member, and means adjacent said open end of said body member for removably connecting said reservoir in communication with a dispensing member, whereby manual pressure applied to said side wall of said reservoir forces a food product therefrom into and through such dispensing member.

References Cited by the Examiner

UNITED STATES PATENTS

| | | | |
|---|---|---|---|
| 1,362,431 | 12/20 | Machles | 15—542 |
| 2,659,919 | 11/53 | McCabe et al. | 15—542 |
| 2,690,657 | 10/54 | Milewski | 15—514 |
| 3,090,071 | 5/63 | Le Brooy | 15—595 |

CHARLES A. WILLMUTH, *Primary Examiner.*